US005798504A

United States Patent [19]

Schwarzkopf

[11] Patent Number: 5,798,504

[45] Date of Patent: Aug. 25, 1998

[54] LENGTH-ADJUSTABLE ELECTRICAL SLEEVE HEATER

[75] Inventor: Eugen Schwarzkopf, Lüdenscheid, Germany

[73] Assignee: Hotset Seizpatronen U. Zubehor GmbH, Ludenscheid, Germany

[21] Appl. No.: 724,013

[22] Filed: Sep. 27, 1996

[30] Foreign Application Priority Data

Oct. 13, 1995 [DE] Germany ............................ 19538205.6

[51] Int. Cl.$^6$ ................................ H05B 3/02; H05B 3/58; F16L 13/02; F16L 15/02

[52] U.S. Cl. .......................... 219/550; 219/535; 285/21.2; 285/302

[58] Field of Search ...................................... 219/535, 544, 219/550; 285/21.2, 31, 32, 145.4, 302, 417, 418, 419; 156/273.9, 274.2, 379.7

[56] References Cited

FOREIGN PATENT DOCUMENTS 295 10 136 6/1995 Germany .

*Primary Examiner*—Teresa J. Walberg
*Assistant Examiner*—Sam Paik
*Attorney, Agent, or Firm*—Herbert Dubno; Andrew Wilford

[57] ABSTRACT

A sleeve heater has a pair of end tubes centered on a common axis and having axially confronting and spaced inner ends, an electrically resistive helicoidal heating coil centered on the axis, and at least one tubular center tube coupled to the end tubes at the inner ends thereof and axially and angularly slidable on at least one of the end tubes so that the length of the heater can be adjusted. The coil has a pair of end sections of relatively shallow pitch in the end tubes and a center section of relatively steep pitch between the inner ends. Thus with this system the user can alter the length of the sleeve heater.

9 Claims, 2 Drawing Sheets

LENGTH-ADJUSTABLE ELECTRICAL SLEEVE HEATER

FIELD OF THE INVENTION

The present invention relates to an electrical heater. More particularly this invention concerns a sleeve heater for heating a nozzle or flow tube of a molding apparatus.

BACKGROUND OF THE INVENTION

As described in commonly owned patent applications 08/401.409 filed 9 Mar. 1995 and 08.483,840 filed 15 Jun. 1995 and in German utility model 295 10 136.9, a sleeve heater used in a molding apparatus to heat a conduit or nozzle typically has an outer tube provided internally with a helical electrically resistive coil. Such a heater is typically slipped over an extruder nozzle or the like and may be fitted inside a passage of a molding apparatus, surrounding such a nozzle or another tube through which molten resin flows.

The coil is centered on the tube axis and has a pair of axially spaced end sections of shallow pitch and a center section of relatively steep pitch joining the end sections. Practice has shown that it is merely important to keep the ends of the heater hot. Thus the fact that there is less heat transfer in the center region of the tube than at the ends is largely irrelevant, as the center steep-pitch portion of the heater coil serves primarily to conduct electricity from the one end section to the other.

Such devices have to be replaced periodically when they burn out, as they are used in very stressful environments. Thus the operator of the molding apparatus must keep a stock of all the different sleeve heaters that might be needed. Thus for each diameter it is necessary to stock heaters of several different lengths. This is clearly an expensive proposition and an annoyance for the machine operator.

OBJECTS OF THE INVENTION

It is therefore an object of the present invention to provide an improved sleeve heater.

Another object is the provision of such an improved sleeve heater which overcomes the above-given disadvantages, that is which reduces the need to stock heaters of different sizes.

SUMMARY OF THE INVENTION

A sleeve heater has according to the invention a pair of end tubes centered on a common axis and having axially confronting and spaced inner ends, an electrically resistive helicoidal heating coil centered on the axis, and at least one tubular center tube coupled to the end tubes at the inner ends thereof and axially and angularly slidable on at least one of the end tubes so that the length of the heater can be adjusted. The coil has a pair of end sections of relatively shallow pitch in the end tubes and a center section of relatively steep pitch between the inner ends.

Thus with this system the user can alter the length of a sleeve heater and therefore does not have to stock a plurality of different such heaters of different lengths. Since the amount of heating in the center region is not significant, if the heater has been stretched so that there is less heating in the center or shortened so there is more, this is not really important. As a result the machine operator need merely stock heaters of the diameters he or she needs without respect to length.

According to the invention the center tube and at least one of the end tubes are provided with means including a helical coupling formation for constraining the one end tube and center tube to move angularly when displaced axially relative to each other. This ensures that when the length is adjusted the inside diameter of the helical center section of the coil will not decrease and restrict the passage through the heater. Increase in the diameter of the coil is impossible since the surrounding tube itself prevents this.

In accordance with the invention the center tube axially overlaps and telescopes with the end tubes. In this case the helical formation is a groove and the means includes a radially extending pin projecting into the groove. In fact one such groove and one such pin can be provided between each end of the center tube and the respective end tube.

In another arrangement according to the invention each of the end tubes is unitarily formed with one such center tube. The center tubes telescope and overlap axially, one being formed with a slot or groove constituting the helical formation and the other being provided with a pin constituting part of the means and engaging radially in the groove. Here the coupling means can include a radially extending screw threaded in one of the tubes, extending radially through the groove, and having a head engageable radially with the other tube. Normally the pin is a screw threaded into the inner center tube and the slot is formed in the outer center tube so that the head of the screw can bear down on the outer tube and clamp the two center tubes together.

It is also possible according to the invention for the center tube and one of the end tubes to be provided with means including crossing grooves and a pin extending radially through both of the crossing grooves. One of the grooves extends axially and the other of the grooves extends angularly.

In all systems according to the invention the end tubes are each provided with a pair of axially spaced inwardly projecting ribs axially confining the respective end section.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
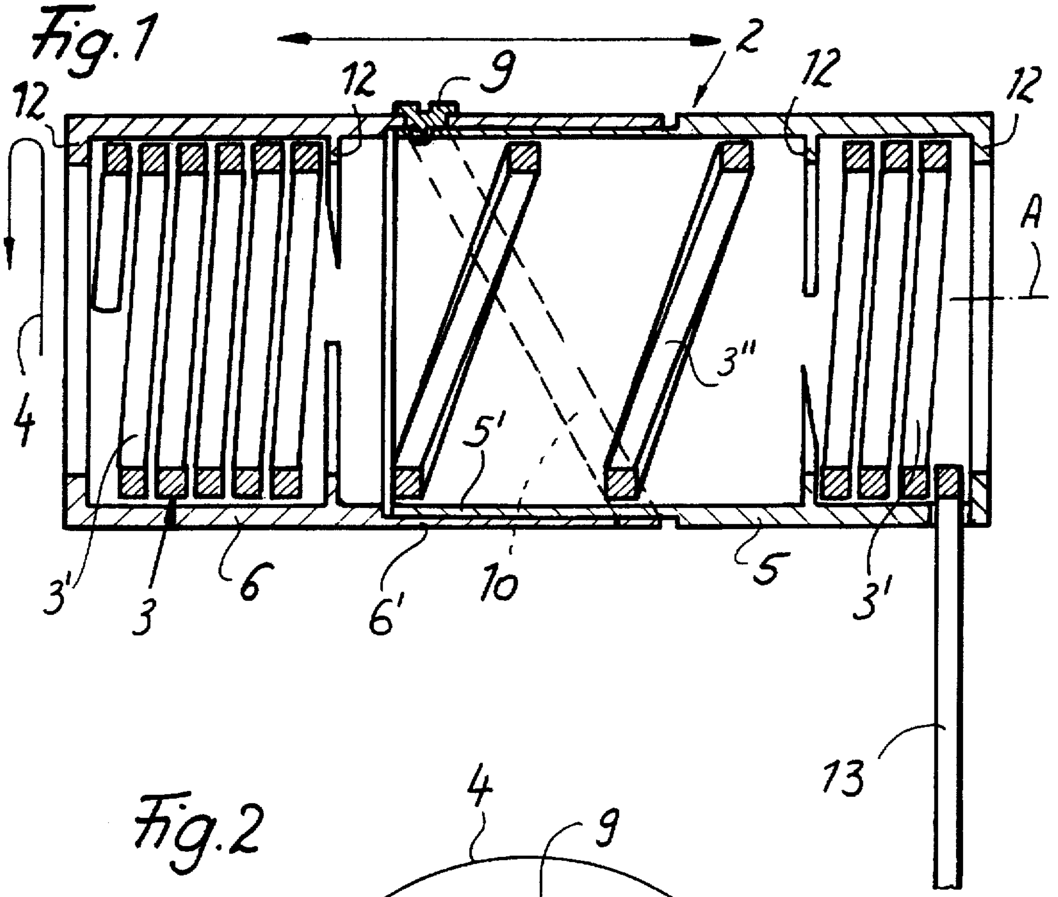
FIG. 1 is an axial section through the sleeve heater according to the invention.
Figure 2:
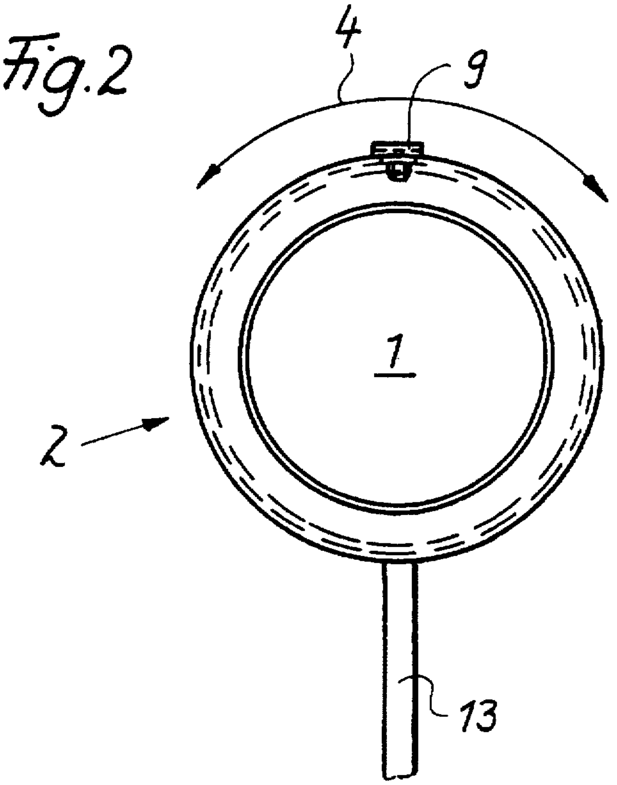
FIG. 2 is an end view of the heater of FIG. 1.

As seen in FIGS. 1 and 2 a sleeve heater according to this invention comprises an outer tube assembly 2 centered on an axis A and holding a coil 3 of a resistive wire as described in the above-mentioned patent documents. The tube assembly 2 is formed by a pair of coaxial end tubes 5 and 6 and a pair of center tubes 5' and 6' that telescope together, axially overlap, and that are formed as thin-walled axial extensions of the respective end tubes 5 and 6. The coil 3 has a pair of shallow-pitch end sections 3' confined by radially inwardly projecting ribs 12 in the end tubes 5 and 6 and a steep-pitch center section 3' lying in the center tubes 5' and 6'. Conductors 13 connected to the ends of the coil 3 serve for electrically energizing it. The tubes 5 and 6 are made of a durable metal such as stainless steel or titanium.

The outer center tube 6' is formed with a helical slot 10 of the same pitch and hand as the center coil section 3". A screw 9 threaded into the inner center tube 5' extends radially through this slot 10 and has a head bearing radially inward on the outer center tube 6'. Thus it is possible, when the screw 9 has been loosened slightly, to rotate the two end tubes 5 and 6 relative to each other as illustrated by the arrow 4 to lengthen it from the position shown in FIG. 1. As the screw 9 moves along the slot 10 it will force the two tubes 5 and 6 apart. Once the desired length is reached, the screw 9 is torqued down to lock the assembly in position. During the adjustment the pitch but not the inside diameter of the center section 3" will vary.

Figure 3:
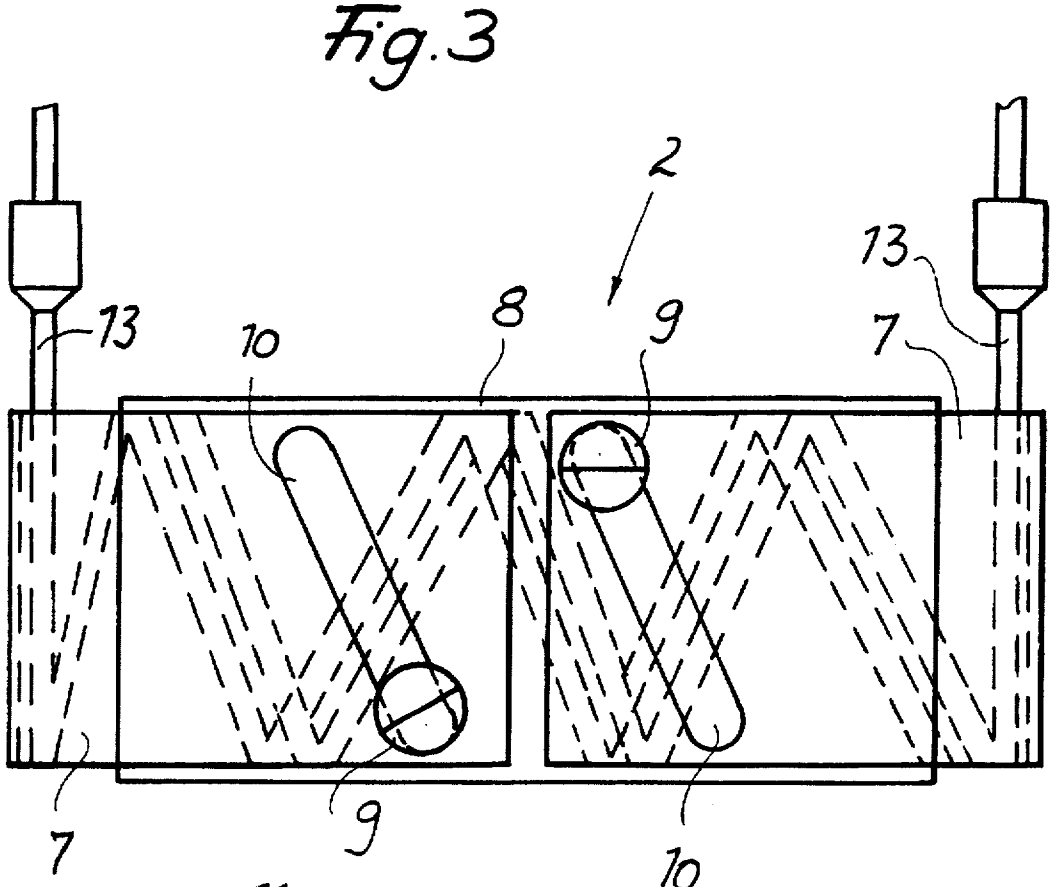
FIG. 3 is a view like FIG. 1 of another heater in accordance with this invention.

In FIG. 3, where reference numerals from FIGS. 1 and 2 are used for functionally identical structure, a pair of end tubes 7 are joined by a single center tube 8 that telescopes over both of the end tubes 7. The center tube 8 is formed with a pair of grooves 10 in which are engaged screws 9 seated in the end tubes 7. This system works like that of FIGS. 1 and 2 except that two screws 9 must be manipulated on adjustment.

Figure 4:
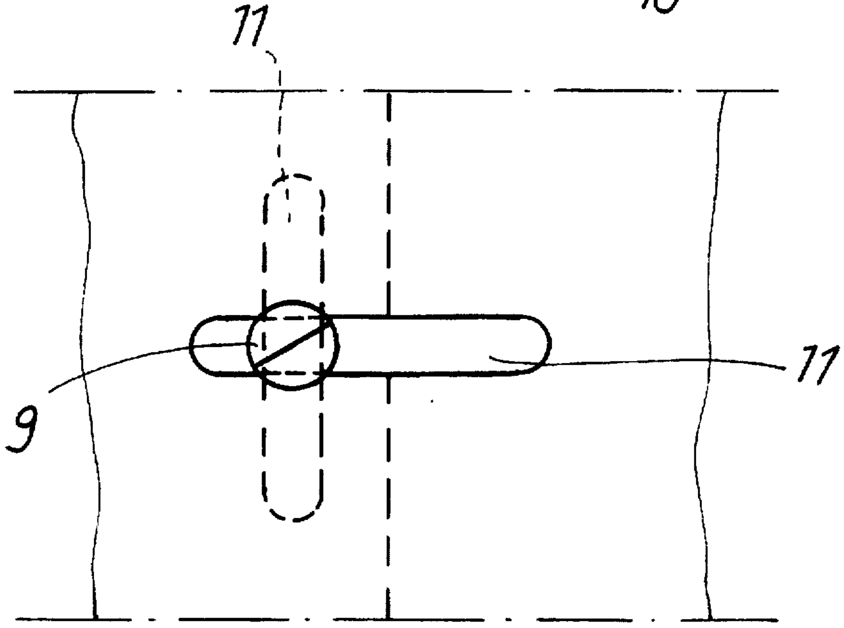
FIG. 4 is a large-scale view of a detail of another arrangement according to the invention.

The system of FIG. 4 shows how the screw 9 can engage in two perpendicularly crossing slots 11 formed in respective tubes. Here during relative rotation the screw 9 will move in both the slots 11.

I claim:

1. A sleeve heater comprising:

a pair of end tubes centered on a common axis and having axially confronting and spaced inner ends;

an electrically resistive helicoidal heating coil centered on the axis and having a pair of end sections of relatively shallow pitch in the end tubes and a center section of relatively steep pitch between the inner ends; and at least one tubular center tube coupled to the end tubes at the inner ends thereof and axially and angularly slidable on at least one of the end tubes, whereby the length of the heater can be adjusted.

2. The sleeve heater defined in claim 1 wherein the center tube and at least one of the end tubes are provided with means including a helical coupling formation for constraining the one end tube and center tube to move angularly when displaced axially relative to each other.

3. The sleeve heater defined in claim 2 wherein the center tube axially overlaps and telescopes with the end tubes.

4. The sleeve heater defined in claim 3 wherein the helical formation is a groove and the means includes a radially extending pin projecting into the groove.

5. The sleeve heater defined in claim 2 wherein each of the end tubes is unitarily formed with one such center tube, the center tubes telescoping and overlapping axially, one of the center tubes being formed with a groove constituting the helical formation and the other center tube being provided with a pin constituting part of the means and engaging radially in the groove.

6. The sleeve heater defined in claim 2 wherein the means includes a radially extending screw threaded in one of the tubes, extending radially through the groove, and having a head engageable radially with one of the tubes.

7. The sleeve heater defined in claim 1 wherein the center tube and one of the end tubes are provided with means including crossing grooves and a pin extending radially through both of the crossing grooves.

8. The sleeve heater defined in claim 7 wherein one of the grooves extends axially and the other of the grooves extends angularly.

9. The sleeve heater defined in claim 1 wherein the end tubes are each provided with a pair of axially spaced inwardly projecting ribs axially confining the respective end section.

* * * * *